United States Patent
Paintz et al.

(10) Patent No.: US 8,461,789 B2
(45) Date of Patent: Jun. 11, 2013

(54) CONTROL OF SINUSOIDALLY DRIVEN BRUSHLESS DC (BLDC) MOTORS

(75) Inventors: Christian Paintz, Erfurt (DE); Thomas Freitag, Erfurt (DE)

(73) Assignee: Melexis Technologies NV, Tessenderlo (BE)

( * ) Notice: Subject to any disclaimer, the term of this patent is extended or adjusted under 35 U.S.C. 154(b) by 492 days.

(21) Appl. No.: 12/887,410

(22) Filed: Sep. 21, 2010

(65) Prior Publication Data

US 2011/0074327 A1 Mar. 31, 2011

(30) Foreign Application Priority Data

Sep. 21, 2009 (GB) .................................. 0916543.2

(51) Int. Cl.
*H02P 6/00* (2006.01)
*H02P 27/04* (2006.01)
*G05B 11/36* (2006.01)

(52) U.S. Cl.
USPC ....... 318/400.35; 318/609; 318/700; 318/801

(58) Field of Classification Search
USPC .............................. 318/400.35, 609, 700, 801
See application file for complete search history.

(56) References Cited

U.S. PATENT DOCUMENTS

| | | | |
|---|---|---|---|
| 4,746,844 A | 5/1988 | MacKelvie et al. |
| 4,772,839 A | 9/1988 | MacMinn et al. |
| 4,928,043 A | 5/1990 | Plunkett |
| 4,992,710 A | 2/1991 | Cassat |
| 5,001,405 A | 3/1991 | Cassat |
| 5,097,190 A | 3/1992 | Lyons et al. |
| 5,134,349 A | 7/1992 | Kruse |
| 5,144,209 A | 9/1992 | Inaji et al. |
| 5,191,269 A | 3/1993 | Carbolante |
| 5,191,270 A | 3/1993 | Mccormack |

(Continued)

FOREIGN PATENT DOCUMENTS

| EP | 0892489 A1 | 1/1999 |
|---|---|---|
| EP | 1478086 A2 | 11/2004 |

OTHER PUBLICATIONS

Final Office Action issued Aug. 1, 2012 corresponding to U.S. Appl. No. 12/634,991 (6 pages).

(Continued)

*Primary Examiner* — Eduardo Colon Santana
*Assistant Examiner* — Gabriel Agared
(74) *Attorney, Agent, or Firm* — Leydig, Voit & Mayer, LLP; Gerald T. Gray

(57) ABSTRACT

In response to the determination or estimation of a back EMF zero crossing event for the phase, a time T1 is calculated, T1 being representative of the desired absolute maximum value of the phase current. Current samples are taken by the current sampling unit symmetrically centered around T1. The values of the samples CS[1] to CS[10] are then input into the error function to calculate an error function value. The calculated error function value is input to the lead angle control unit which calculates a value for lead_angle. The value of lead_angle is calculated to be the adjustment in phase angle of the driving voltage profile that will minimize the absolute value of the error function. In generating and adjusting the driving voltage profile the driving voltage generation unit takes into account both lead_angle and the output of the position and speed estimation unit. The estimated motor speed may be used additionally in an outer speed control loop involving speed controller to adjust the amplitude (AMP) of the effective driving voltage.

16 Claims, 4 Drawing Sheets

U.S. PATENT DOCUMENTS

| | | | |
|---|---|---|---|
| 5,384,527 A * | 1/1995 | Rozman et al. | 322/10 |
| 5,473,240 A * | 12/1995 | Moreira | 318/801 |
| 5,517,095 A | 5/1996 | Carobolante et al. | |
| 5,525,874 A | 6/1996 | Mallarapu et al. | |
| 5,796,235 A | 8/1998 | Schrodl et al. | |
| 5,859,512 A | 1/1999 | Buthker | |
| 5,859,520 A | 1/1999 | Bourgeois et al. | |
| 6,011,368 A | 1/2000 | Kalpathi et al. | |
| RE36,568 E | 2/2000 | Horst | |
| 6,023,141 A | 2/2000 | Chalupa | |
| 6,034,493 A | 3/2000 | Boyd et al. | |
| 6,072,289 A | 6/2000 | Li | |
| 6,081,091 A * | 6/2000 | Mitchell et al. | 318/685 |
| 6,107,772 A | 8/2000 | Liu et al. | |
| 6,124,689 A | 9/2000 | Kardash | |
| 6,163,120 A | 12/2000 | Menegoli | |
| 6,531,843 B2 | 3/2003 | Iwaji et al. | |
| 6,583,593 B2 | 6/2003 | Iijima et al. | |
| 6,661,192 B2 | 12/2003 | Copeland | |
| 6,795,268 B1 | 9/2004 | Ryan | |
| 6,825,646 B2 | 11/2004 | Colombo | |
| 6,885,163 B2 | 4/2005 | Heidrich | |
| 6,979,970 B2 | 12/2005 | Iwanaga et al. | |
| 6,995,530 B2 | 2/2006 | Biamonte et al. | |
| 7,138,776 B1 | 11/2006 | Gauthier et al. | |
| 7,141,949 B2 | 11/2006 | Harwood | |
| 7,166,980 B1 | 1/2007 | LeGrand | |
| 7,180,262 B2 | 2/2007 | Consoli et al. | |
| 7,202,618 B2 | 4/2007 | Ide et al. | |
| 7,245,104 B2 | 7/2007 | Tomigashi et al. | |
| 8,030,867 B1 | 10/2011 | Allison, III | |
| 8,063,591 B2 * | 11/2011 | Yamamoto | 318/280 |
| 2001/0048278 A1 | 12/2001 | Young et al. | |
| 2004/0056627 A1 | 3/2004 | Grasso et al. | |
| 2004/0075407 A1 | 4/2004 | Ohiwa et al. | |
| 2004/0263104 A1 | 12/2004 | Iwanaga et al. | |
| 2005/0146296 A1 | 7/2005 | Klemm et al. | |

OTHER PUBLICATIONS

Non-Final Office Action issued Sep. 13, 2012 corresponding to U.S. Appl. No. 12/065,598 (19 pages).

Non-Final Office Action issued Jan. 18, 2013 corresponding to U.S. Appl. No. 13/061,069 (14 pages).

Non-Final Office Action issued Feb. 14, 2013 corresponding to U.S. Appl. No. 12/634,991 (7 pages).

International Search Report issued Feb. 23, 2007 for PCT/IB2006/002430 with an International Filing Date of Sep. 4, 2006 [corresponding to U.S. Appl. No. 12/065,598].

Schmidt, et al. "Initial Rotor Angle Detection of a Non-Salient Pole Permanent Magnet Synchronous Machine," IEEE Industry Society, Annual Meeting, New Orleans, Louisiana (Oct. 5-9, 1997).

* cited by examiner

CONTROL OF SINUSOIDALLY DRIVEN BRUSHLESS DC (BLDC) MOTORS

BACKGROUND

The present invention relates to the control of BLDC motors and in particular to the control of sinusoidally driven BLDC motors.

Driving BLDC motors with sinusoidal currents improves efficiency of operation and reduces acoustic noise when compared with 120° block mode commutation. As with all schemes for driving BLDC motors, efficient implementation requires that the rotor position and the difference between the applied voltage and the resulting current are monitored such that sinusoidal currents may be applied in phase with the rotor rotation. Present methods for monitoring motor position in sinusoidally driven BLDC motors add significantly to the overall system complexity and cost.

An example of the above is the monitoring scheme disclosed in the Microchip Technology Inc. Application Note AN1078; "Sensorless Field Oriented Control of PMSM Motors." This discloses a sensorless field oriented control (FOC) method of monitoring the rotor position. This method, for a 3 phase motor, uses at least 2 shunt resistors to measure the phase currents in two of the motor phases and then calculates the third current. The phase currents are then converted to a two axis vector system, which is rotated through a calculated transformation angle (based on a previous iteration of the control loop). The rotation generates two new current variables from which a corresponding pair of voltage variables is generated. A new transformation angle is estimated, and the voltage variables are rotated back to a stationary reference frame and converted to 3 phase voltage values. The 3 phase voltage values can then be used to calculate suitable driving voltages. As the FOC algorithm is very complex mathematically, this method requires a very high calculation power DSP (digital signal processor). Additionally, this method requires at least 2 shunt resistors to measure the motor phase currents needed as input for the FOC algorithm. Both add to the cost and complexity involved with implementing such a system.

The document U.S. Pat. No. 7,294,982 discloses measurement of the current zero crossing points during steady state (constant speed, constant load) operation to control a sinusoidally driven BLDC motor. As this method is not reliable during speed or load changes or during driving in PWM mode, a second control scheme is utilised. This involves interrupting the driving current to measure the BEMF and controlling the driving voltage so that a measured motor drive current coincides with calculated current instruction signal. To achieve this, target current values (SPN CRNT DATA) are calculated and subsequently processed in a current error detector, a current control filter and a profile generator module. Calculating target current values in addition to PWM driving voltages at least doubles the computational complexity of the algorithm with respect to calculating PWM driving voltages only. The algorithm therefore also requires expensive hardware such as a DSP for implementation.

The document U.S. Pat. No. 7,525,268 discloses a method of measuring the current zero crossing for deducing the distance between the time instant of the expected zero crossing and the actual zero crossing instant; the further means is suitable for determining the phase shift between the driving voltage of the electric motor and the induced back electromotive force based on the distance. Typically it is desired that the BEMF zero crossing is aligned with the current zero crossing for optimum motor efficiency. Therefore this method can not be used together with the method of estimating the rotor position based on back EMF zero crossings.

SUMMARY

It is therefore an object of the present invention to provide a method of controlling a sinusoidally driven BLDC motor that at least partially overcomes or alleviates the above drawbacks. It is a further object that this might be achieved by directly taking measurements of the back EMF voltage and current samples of all motor phases individually in order to align the phase current with the back EMF voltage.

According to a first aspect of the present invention there is provided a method of controlling a sinusoidally driven BLDC motor comprising the steps of: determining a time T1 at which a phase current maximum in a particular motor phase should occur based on detected or estimated back EMF zero crossing events; taking a series of samples representative of the phase current of the motor phase at symmetrical intervals before and after the time T1; using the samples to determine an error function value indicative of the lead angle of the phase current; and adjusting the driving voltage profile to minimise or otherwise selecting the absolute magnitude of the error function value.

Using the above methods, control of a sinusoidally driven BLDC motor can be achieved without the need for position sensors and with just a single shunt resistor in an efficient way. The method is furthermore robust under changing load and/or supply conditions. Additionally, the method has a sufficiently low computational complexity that it is suitable for implementation on a microcontroller.

The motor driving voltage profile may be a profile substantially proportional to a temporarily-constant voltage profile. The temporarily-constant voltage profile may be selected to be suitable for the particular motor and its particular operation point.

Samples representative of the phase current of the motor phase may be obtained by taking samples of the DC-link current on a shunt resistor. The current sampling may be undertaken by a current sampling unit comprising a sample and hold circuit connected to an analogue to digital converter. The current sampling operation may be controlled by a synchronisation unit.

The back EMF zero crossing events may be detected by monitoring the back EMF voltage on the phase for zero crossings. This can be achieved by interpolation from one or more samples of the back EMF or by use of a comparator. Back EMF monitoring can be carried out by a back EMF sampling unit which may comprise a comparator or a sampling unit and interpolation unit. If a back EMF sampling unit is used, it may operate in response to the synchronisation unit.

Back EMF zero crossing detection may be used to estimate a rotor speed and/or position. The detected back EMF, rotor speed or rotor position may be used to estimate future back EMF zero crossing events or to determine the time T1. In order to implement the above, the back EMF sampling unit may further comprise or be connected to a speed and position estimation unit. The speed and position estimation unit may be operable to determine rotor position and speed based on back EMF zero crossing events. The speed and position estimation unit may be also operable to estimate future back EMF zero crossing events or determine the time T1.

The error function may be any suitable function. In one preferred embodiment, the error function comprises taking the difference in the sum of the current sample values taken prior to T1 and the sum of all the current sample values taken after T1. In another embodiment, the error function comprises the steps of: determining the maximum current sample value, determining the time at which the maximum current sample was taken and calculating the interval between T1 and the time at which the maximum current sample value was taken. In either instance, the error function value is indicative of the lead angle of the phase current relative to the back EMF.

The calculation of the error function value may be carried out by a current processing unit. The current processing unit may be operable to receive the output of the current sampling unit and calculate the error function value from the received current sample values. The calculation of the error function may take place after each zero crossing or after selected zero crossings. The selected zero crossings may be selected periodically after n intervals or after a predetermined time interval. Additionally or alternatively, the selected zero crossings may be selected in response to a variation in motor speed or motor load.

The lead angle may be calculated from the error function value. This calculation may be undertaken by a lead angle control unit. The lead angle control unit may comprise a PI controller (proportional-integral controller). A desired lead_angle value may be calculated which would minimise (or select another desired value of) the error function value. The lead angle control unit may be further operable to calculate the desired lead_angle value.

The driving voltage profile may be adjusted in response to the lead angle or the desired lead_angle value. The adjustment may comprise advancing or delaying the driving voltage profile. In order to achieve the above, the lead angle control unit may feed the desired lead_angle value into a driving voltage generation unit. The driving voltage generation unit may then be operable to adjust the driving voltage profile in response to the lead angle.

The driving voltage profiles may be implemented as PWM driving profiles. This may be implemented by the driving voltage generation unit. The driving voltage profiles may be temporarily suspended during a sampling period. A signal conditioning unit may be provided to synchronise the output of the driving voltage generation unit with the motor speed. The signal conditioning unit may be additionally operable to temporarily suspend the driving of one or more phases during a sampling period. The suspension may be undertaken in response to the synchronisation unit According to a second aspect of the present invention there is provided a method of monitoring the rotor position in a sinusoidally driven BLDC motor comprising the steps of: determining a time T1 at which a phase current maximum in a particular motor phase should occur based on detected or estimated back EMF zero crossing events; taking a series of samples representative of the phase current of the motor phase at symmetrical intervals before and after the time T1; and using the samples to determine an estimate of rotor position.

The method of the second aspect of the present invention may incorporate any or all features of the first aspect of the present invention as are desired or as are appropriate.

Using the above methods, the rotor position of a sinusoidally driven BLDC motor can be calculated without the need for position sensors and with just a single shunt resistor in an efficient way. The method is furthermore robust under changing load and/or supply conditions. Additionally, the method has a sufficiently low computational complexity that it is suitable for implementation on a microcontroller.

The estimate of rotor position may involve determining an indication of the lead angle of the phase current relative to the back EMF. This indication may be determined by calculating an error function value. The method may then involve the further step of adjusting the driving voltage profile to minimise or otherwise selecting the absolute magnitude of the error function value. By minimising the error function value the phase current may be substantially aligned with the back EMF. This is likely to be the primary mode of operation as this maximises the efficiency of motor operation. By selecting an alternative value, the phase current may be controllably arranged to lag or lead the back EMF by a desired phase angle. This can be useful in field weakening operation of the motor.

According to a third aspect of the present invention there is provided a BLDC motor operable in accordance with the method of the first aspect of the present invention or the second aspect of the present invention.

The motor of the third aspect of the present invention may incorporate any or all features of the first or second aspects of the present invention as are desired or as are appropriate.

The skilled man will appreciate that the above methods may equally be applied to a Permanent Magnet Synchronous Motor (PMSM).

According to a fourth aspect of the present invention there is provided a method of monitoring the rotor position in a PMSM comprising the steps of: determining a time T1 at which a phase current maximum in a particular motor phase should occur based on detected or estimated back EMF zero crossing events; taking a series of samples representative of the phase current of the motor phase at symmetrical intervals before and after the time T1; and using the samples to determine an estimate of rotor position.

According to a fifth aspect of the present invention there is provided a method of controlling a PMSM comprising the steps of: determining a time T1 at which a phase current maximum in a particular motor phase should occur based on detected or estimated back EMF zero crossing events; taking a series of samples representative of the phase current of the motor phase at symmetrical intervals before and after the time T1; using the samples to determine an error function value indicative of the lead angle of the phase current; and adjusting the driving voltage profile to minimise or otherwise selecting the absolute magnitude of the error function value.

According to a sixth aspect of the present invention there is provided a PMSM operable in accordance with the method of the fourth aspect of the present invention or the fifth aspect of the present invention.

The methods of the fourth and fifth aspects of the present invention or the motor of the sixth aspect of the present invention may incorporate any or all features of the first, second and third aspects of the present invention as are desired or as are appropriate.

BRIEF DESCRIPTION OF THE DRAWINGS

In order that the invention is more clearly understood one embodiment will now be described in more detail, by way of example only and with reference to the accompanying drawings, in which:—

DETAILED DESCRIPTION

Figure 1:
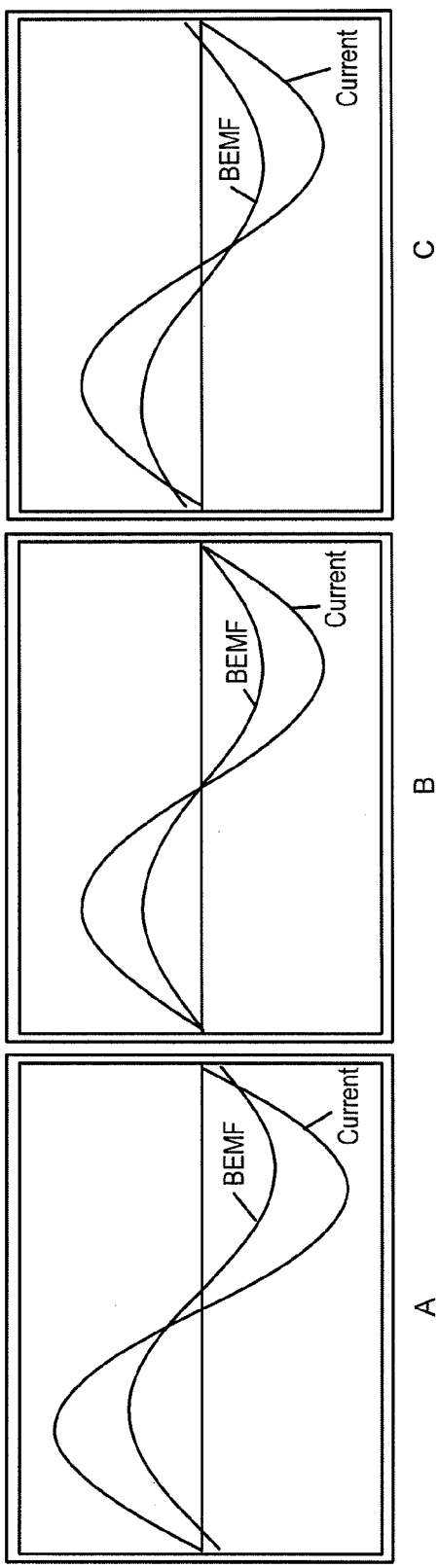
FIG. 1A illustrates the phase current and back EMF in an undriven coil of a BLDC motor in the event that the back EMF lags the phase current.
FIG. 1B illustrates the phase current and back EMF in an undriven coil of a BLDC motor in the event that the back EMF is synchronised with the phase current.
FIG. 1C illustrates the phase current and back EMF in an undriven coil of a BLDC motor in the event that the back EMF leads the phase current.

Turning now to FIG. 1, the relationship between the back EMF voltage and the phase current of a phase A of a BLDC motor is shown. In the case of a 3 phase BLDC motor there will be two further phases B, C each having a like back EMF and current relationship. In the example of FIG. 1A the back EMF lags the phase current; in FIG. 1B the back EMF is synchronised with the phase current; and in FIG. 1C the back EMF leads the phase current.

Since maximum operational efficiency (and minimised acoustic noise) occurs when the back EMF and phase current are synchronised (FIG. 1B) the present invention will be described in terms of achieving such a situation. The skilled man will however appreciate that the present invention may also be utilised to arrange for the back EMF to lag or lead the phase current by a desired amount. This may be desirable in certain situations such as in field weakening operation.

Figure 2:
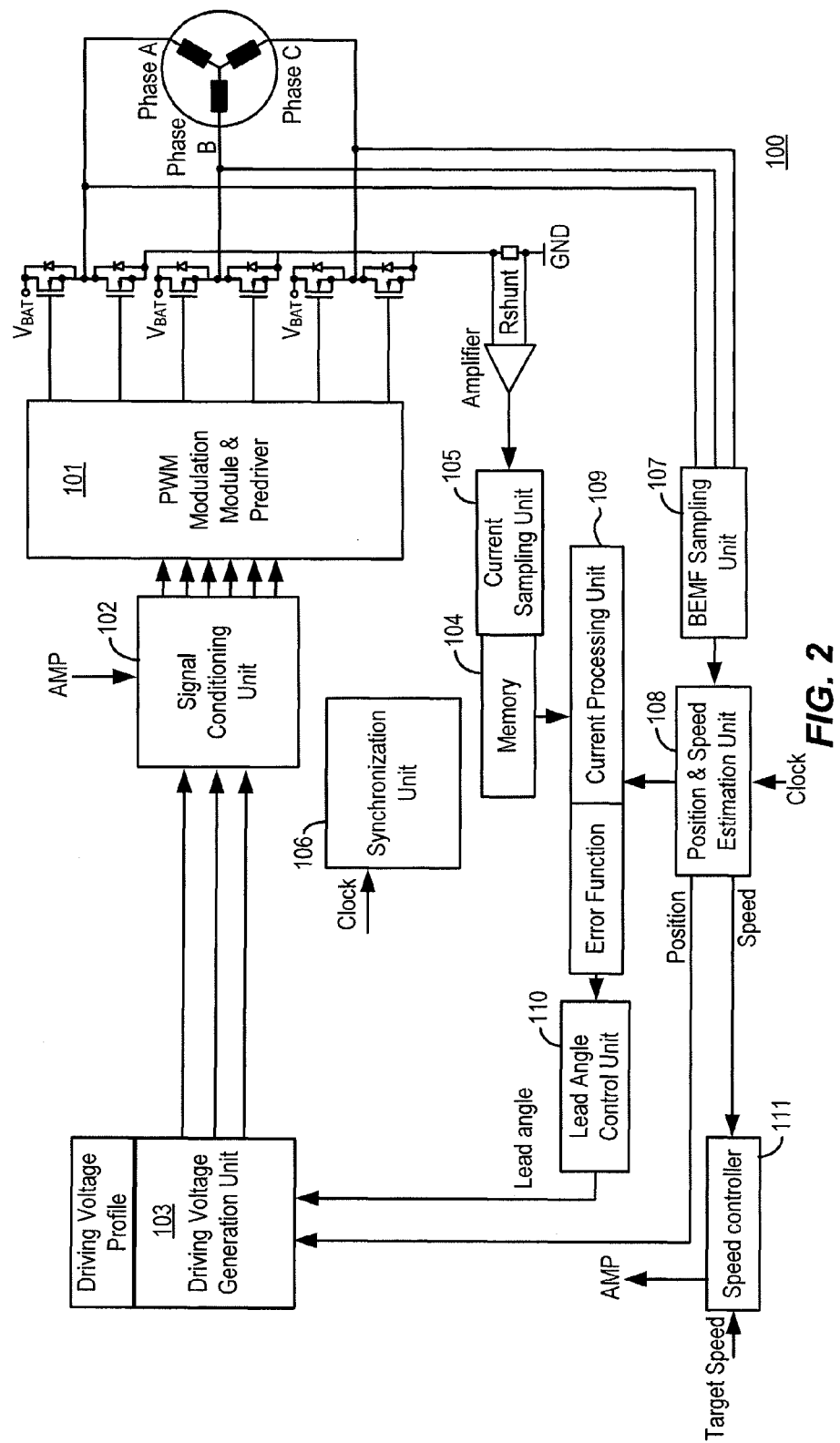
FIG. 2 shows a block diagram of a BLDC motor of the present invention.

Turning now to FIG. 2, a 3 phase BLDC motor is driven by 3 half bridges. These enable the phases to be driven by a desired voltage profile at a desired PWM duty cycle. The application of a driving profile to the half bridges is controlled by six driving transistors operable in response to a PWM modulation module 101 to apply the driving profile at a desired PWM duty cycle. The driving profile is generated by a driving voltage generation unit 103 and its amplitude and duration are controlled by a signal conditioning unit 102.

In the present invention, the DC-link current flowing through a common shunt resistor Rshunt is measured by a current sampling unit 104. The current sampling unit 104 comprises a sample and hold circuit and an analogue to digital converter (ADC) for the digitisation of current samples. The timing of the sample and hold circuit is controlled by a synchronization unit 106. The current sample values are stored in a memory 105 before further processing.

The three BLDC motor phases are also connected to a back EMF sampling unit 107. The back EMF sampling unit 107 is operable to measure the voltage of a motor phase while it is undriven in order to determine the back EMF zero crossing point. This thereby enables the rotor position and speed to be estimated. The back EMF sampling unit 107 operates in response to the synchronisation unit 106 and selects the appropriate motor phase in response to the synchronisation unit 106.

A position and speed estimation unit 108 is connected to the back EMF sampling unit 107 for the purpose of estimating the rotor speed and position from the samples taken by the back EMF sampling unit 107. The position and speed estimation can be achieved by any suitable means. In one example this may be the well known method of detecting the back EMF zero crossing with a comparator. Alternatively, this may be by way of interpolation from the back EMF sampling unit 107 samples.

A current processing unit 109 is provided to retrieve current samples stored in the current sampling unit 104 memory and calculate an error function value from the selected current samples. The calculated error function value is used by a lead angle control unit 110 to determine the phase angle between the back EMF and the phase current. This can then be input to the driving voltage generation unit 103 to adjust the generated voltage profile.

Figure 3:
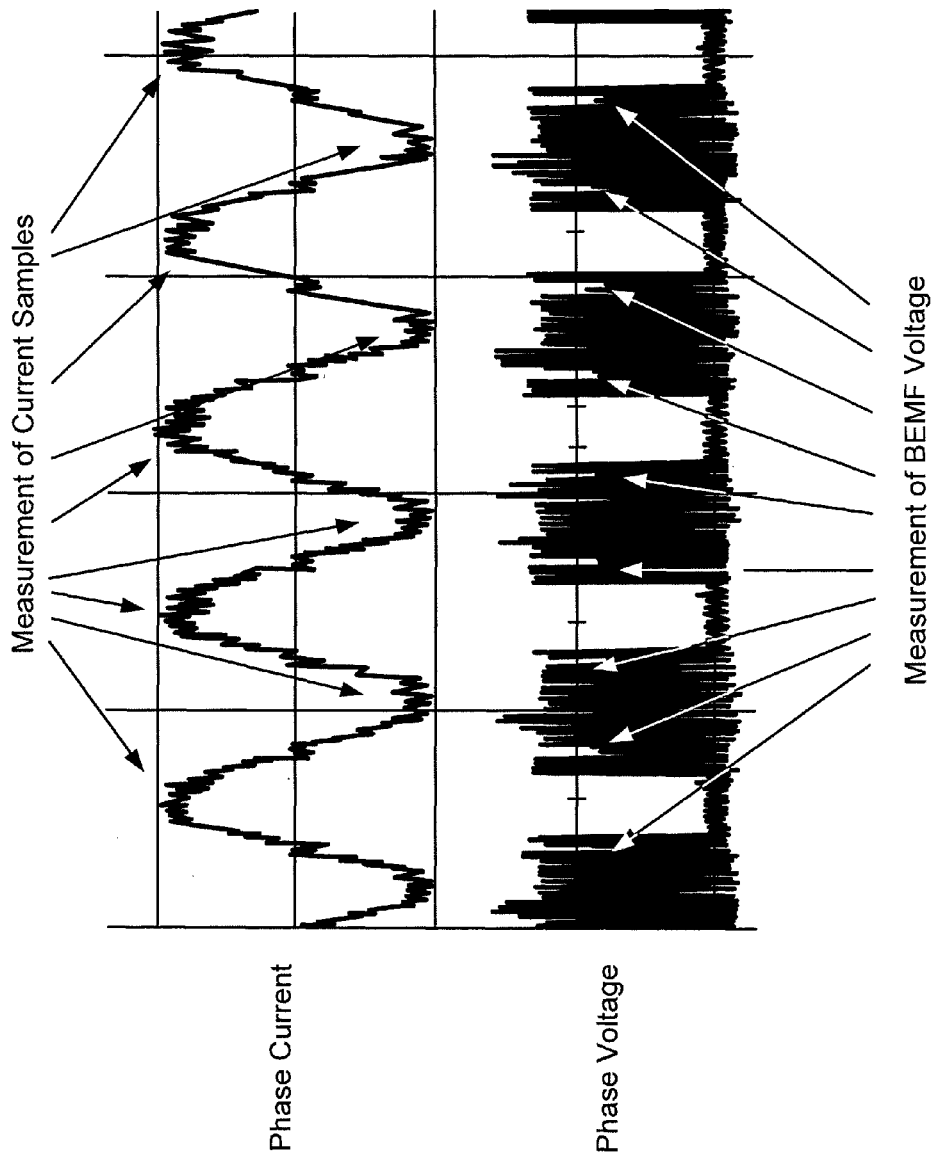
FIG. 3 shows the phase current and phase voltage of a running BLDC motor according to the present invention.
Figure 4:
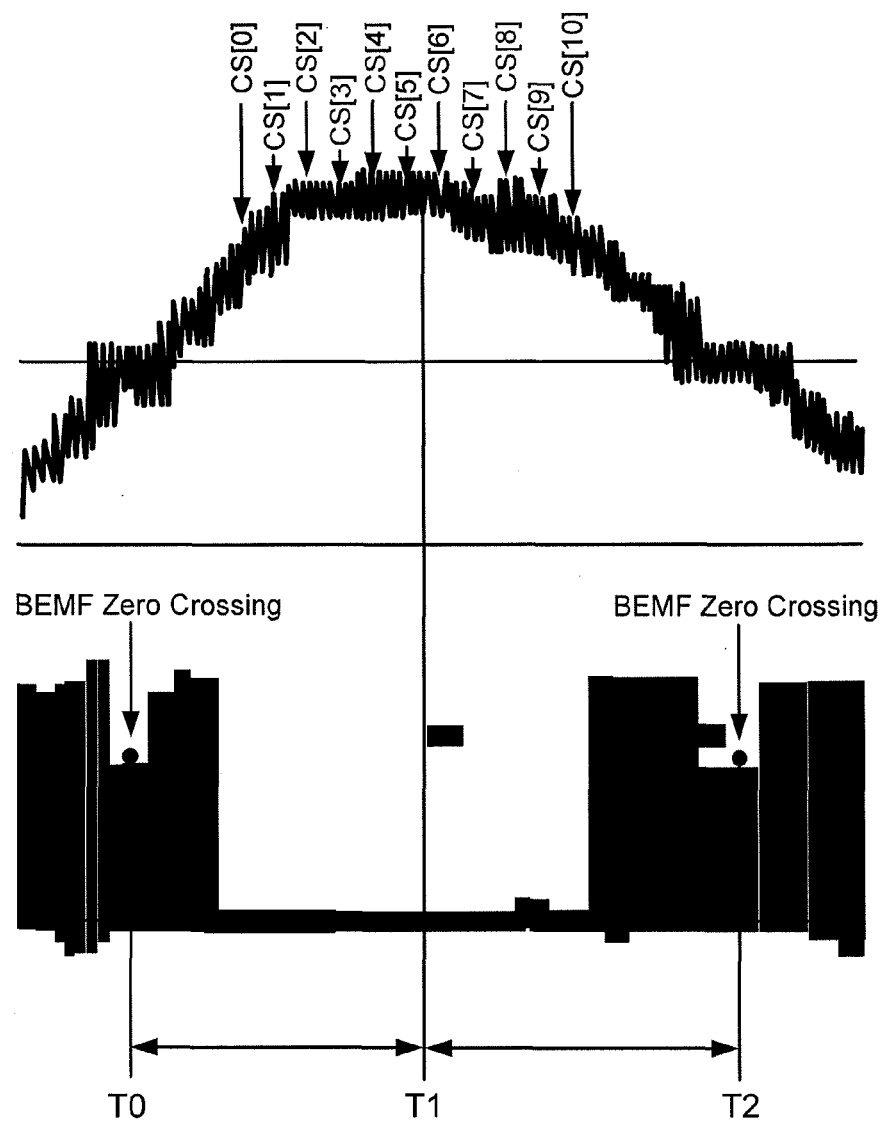
FIG. 4 is an expanded view of FIG. 3 illustrating the times at which samples of the phase current are taken according to the present invention.

Turning now to FIGS. 3 & 4, the specific selection of samples and error function calculation are explained in greater detail. In FIG. 3 the phase current and back EMF voltage of one phase of the motor is shown.

In order to allow the measurement of the back EMF the phase voltage is periodically undriven for short periods of time. At these times, the phase current is substantially zero. These undriven periods can be implemented, when a zero crossing of the phase current or the back EMF is predicted. The undriven periods are initiated and controlled by the signal conditioning unit 102.

In response to the determination or estimation of a back EMF zero crossing event for the phase, a time T1 is calculated by the position and speed estimation unit 108. The time T1 is representative of the desired absolute maximum value of the phase current. Typically, T1 is the midpoint between a detected back EMF zero crossing event and the next predicted back EMF zero crossing event, determined in relation to the time of the last detected or estimated back EMF zero crossing event and the rotor speed. If a phase angle between the current and the back EMF is desired T1 may be offset from this midpoint; if synchronisation is desired, then the offset may be set to zero. In essence:—

$$T1=T0+(T2-T0)/2+\text{offset}$$

This is graphically illustrated by FIG. 4 which is an expanded view of part of FIG. 3, showing two BEMF zero crossings at T0 and at T2. Whilst FIG. 4 only shows one phase voltage zero crossings, the skilled man will appreciate that without any deviation from the spirit of the invention zero crossings of the other phases may be used in order to calculate time T1.

The timing of current samples taken by the current sampling unit 104 is determined by reference to T1. The selected current samples CS[1] to CS[10] are symmetrically centred around T1. The values of the samples CS[1] to CS[10] are then input into the error function to calculate an error function value.

In one suitable implementation the error function is based upon the difference between two sums of current samples: a sum of the selected current samples prior to T1; and a sum of the selected current samples after T1. In the example of FIG. 4:

Sum_prior=$CS[1]+CS[2]+CS[3]+CS[4]+CS[5]$

Sum_after=$CS[6]+CS[7]+CS[8]+CS[9]+CS[10]$

Error Function=CONSTANT*(Sum_prior−Sum_after)

In alternative embodiments, other error function implementations are conceivable and are within the spirit of the present invention. One such example would be an error function that involves finding the current sample with the maximum value from the (possibly low pass filtered) selected samples CS1 . . . CS10. The time corresponding to the maximum value sample can then be defined as CSmax_time and the error function value can be related to the expression (CSmax_time−T1). This alternative function is however less than ideal, because of the big susceptibility to noise present in the current samples and due to the need for a maximum search algorithm.

In the preferred embodiment, the error function can be evaluated after each BEMF zero crossing.

As above, the calculated error function value is input to the lead angle control unit 110. The lead angle control unit 110 contains a PI controller which calculates a value for lead_angle. The value of lead_angle is calculated to be the adjustment in phase angle of the driving voltage profile that will minimise the absolute value of the error function.

In generating and adjusting the driving voltage profile the driving voltage generation unit 103 takes into account both lead_angle and the output of the position and speed estimation unit 108. The estimated motor speed may be used additionally in an outer speed control loop involving speed controller 111 to adjust the amplitude (AMP) of the effective driving voltage.

Taking into account the speed and position data the driving voltage generation unit 103 selects the three target PWM duty cycle values PWMA_INST, PWMB_INST, PWMC_INST for the respective motor phases A, B, C from a stored driving voltage profile table (typically a sinusoidal profile). The adjustment of each profile in response to lead_angle takes the following form:

PWMA_INST=Table_Data[position+lead_angle]

PWMB_INST=Table_Data[position+lead_angle+120 degrees]

PWMC_INST=Table_Data[position+lead_angle+240 degrees]

The three instantaneous PWM duty cycle values are then input to the signal conditioning unit 102. The signal conditioning unit 102 multiplies the three incoming PWMA_INST, PWMB_INST, PWMC_INST values by the speed controller output AMP. Subsequently, the signal conditioning unit 102 performs a suitable signal conditioning depending on the desired state of operation.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of controlling a sinusoidally driven brushless DC (BLDC) motor or a sinusoidally driven Permanent Magnet Synchronous Motor (PMSM), the method comprising the steps of:
   determining a time T1 at which a phase current maximum in a particular motor phase should occur based on detected or estimated back EMF zero crossing events;
   taking a series of samples representative of the phase current of the motor phase at symmetrical intervals before and after the time T1;
   using the samples to determine an error function value indicative of the lead angle of the phase current; and
   adjusting the driving voltage profile to minimise or to select the absolute magnitude of the error function value.

2. A method as claimed in claim 1 wherein the motor driving voltage profile is a profile substantially proportional to a temporarily-constant voltage profile.

3. A method as claimed in claim 1 wherein samples representative of the phase current of the motor phase are obtained by taking samples of the DC-link current on a shunt resistor.

4. A method as claimed in claim 1 wherein the back EMF zero crossing events are detected by monitoring the back EMF voltage on the phase for zero crossings.

5. A method as claimed in claim 4 wherein the detected back EMF is used to estimate a rotor speed and/or position.

6. A method as claimed in claim 4 wherein the detected back EMF, rotor speed or rotor position is used to estimate future back EMF zero crossing events or to determine the time T1.

7. A method as claimed in claim 1 wherein the error function comprises taking the difference in the sum of the current sample values taken prior to T1 and the sum of all the current sample values taken after T1.

8. A method as claimed in claim 1 wherein the error function comprises the steps of: determining the maximum current sample value, determining the time at which the maximum current sample was taken and calculating the interval between T1 and the time at which the maximum current sample value was taken.

9. A method as claimed in claim 1 wherein the lead angle is calculated from the error function value.

10. A method as claimed in claim 9 wherein a desired lead_angle value is calculated which would minimise (or select another desired value of) the error function value.

11. A method as claimed in claim 10 wherein the driving voltage profile is adjusted in response to the lead angle or the desired lead_angle value.

12. A method as claimed in claim 1 wherein the driving voltage profiles are implemented as PWM driving profiles.

13. A method as claimed in claim 1 wherein the driving voltage profiles are temporarily suspended during a sampling period.

14. A brushless DC (BLDC) motor or a Permanent Magnet Synchronous Motor (PMSM) operable in accordance with the method of claim 1.

15. A method of monitoring the rotor position in a sinusoidally driven brushless DC (BLDC) motor or a sinusoidally driven Permanent Magnet Synchronous Motor (PMSM), the method comprising the steps of:
   determining a time T1 at which a phase current maximum in a particular motor phase should occur based on detected or estimated back EMF zero crossing events;
   taking a series of samples representative of the phase current of the motor phase at symmetrical intervals before and after the time T1;
   using the samples to determine an estimate of rotor position;
   wherein the estimate of rotor position involves determining an indication of the lead angle of the phase current relative to the back EMF by calculating an error function value; and
   wherein the method involves the further step of adjusting the driving voltage profile to minimise or to select the absolute magnitude of the error function value.

16. A brushless DC (BLDC) motor or a Permanent Magnet Synchronous Motor (PMSM) operable in accordance with the method of claim 15.

* * * * *